FORMAT CONTROL FOR DISK RECORDING
Filed Oct. 1, 1963 2 Sheets-Sheet 1
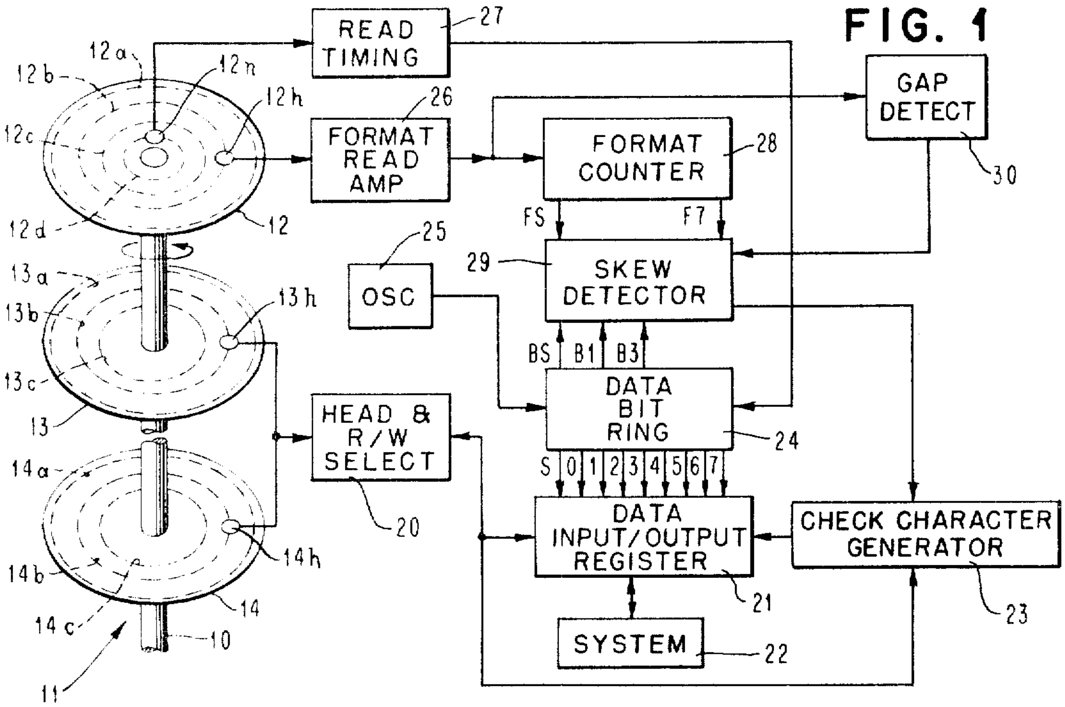
FIG. 2
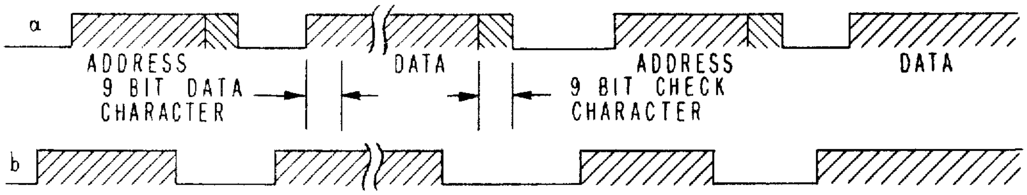
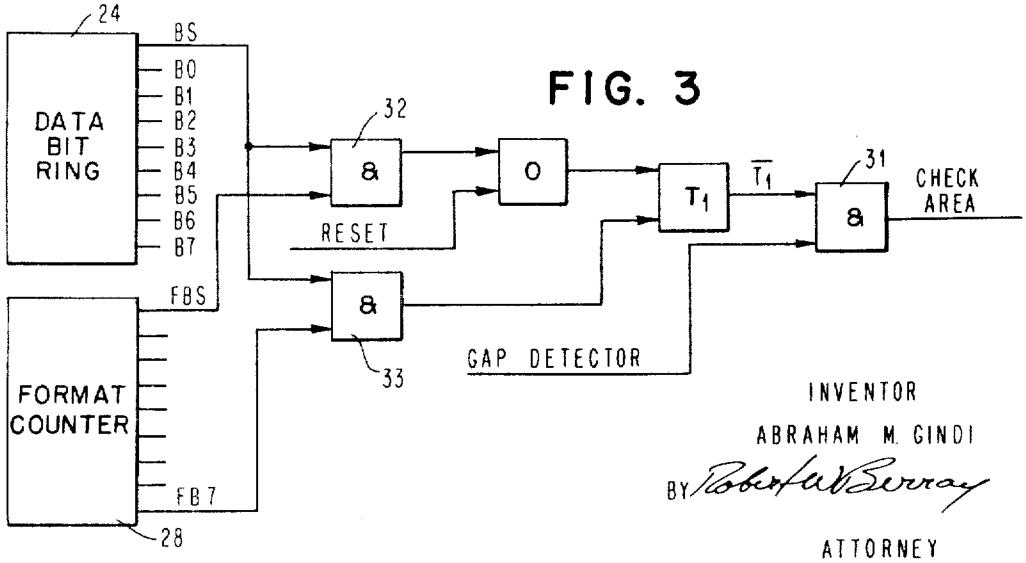
INVENTOR
ABRAHAM M. GINDI
BY Robert W. Berray
ATTORNEY United States Patent Office 3,331,053

Patented July 11, 1967

3,331,053

FORMAT CONTROL FOR DISK RECORDING

Abraham M. Gindi, Poughkeepsie, N.Y., assignor to International Business Machines Corporation, New York, N.Y., a corporation of New York Filed Oct. 1, 1963, Ser. No. 313,033
5 Claims. (Cl. 340—172.5)

ABSTRACT OF THE DISCLOSURE

A disc file storage apparatus wherein the recording and reproducing of data of different lengths on data tracks is under partial control of a format track associated with the data tracks. The format track transducer develops pulses counted by a format counter which are compared with pulses counted from the data track read/write timing source. Logic is provided for recognizing when the data counter and format counter get out of synchronization and insures that all data is transferred even though the format track transducer is providing an erroneous indication.

In the field of data processing, there is extensive use of random access storage files which are in the form of a plurality of recording disks mounted for rotation on a common spindle. Both surfaces of each of these disks are generally provided with a magnetizable recording medium with which one or more transducers cooperate to record data and to reproduce this data on demand. In such random access files the recording surface of each disk is generally divided into a plurality of concentric recording tracks proceeding radially from the center of the disk. Each of such tracks in turn is usually broken down into a plurality of records. One common form of disk file is provided with fifty disks, with 200 tracks per disk surface, and each track is divided into five records of equal length around the track. The start and stop points of each record are controlled by so-called sector heads or transducers which are fixed relative to the rotating disks and which sense one or more sector marks provided on one of the disks to provide start and stop pulses for each of the five records on every track. The use of such sector heads for determining record length is satisfactory under some circumstances, but it does have the disadvantage that it results in records of fixed length on all tracks of all disks in the file. While it may be desirable, or even necessary, in some applications to provide records of fixed length, there are many applications where it is a distinct advantage to have records of different lengths available in different portions of the disk file, particularly where there are a large number of data surfaces provided in the file and a variety of different types of data to be recorded thereon.

There is disclosed in copending application Ser. No. 161,814, by J. E. Applequist et al., filed Dec. 26, 1961, now Patent No. 3,208,057, Sept. 21, 1965, entitled, Format Control for Disk Recording, and assigned to the assignee of this invention, a disk file having a plurality of different record surfaces thereon wherein the use of a format arrangement results in records of different lengths on the same or different disk surfaces. A disk file is provided with one recording surface called a format surface on which is recorded a format track arrangement which controls the record lengths on the data disk surfaces. In one embodiment, for use with a disk file having a plurality of disks mounted on a common vertical spindle, the format disk is the uppermost disk in the file and is provided with as many concentric format tracks as there are data tracks on each of the underlying data disks. Each format track on the format disk is thus associated with a "cylinder" of underlying data tracks on the different data disks, and each such format track thus controls the arrrangement of data records on all of the underlying data tracks within this cylinder. Each data surface of the disks is provided with its own transducer which magnetically cooperates therewith for recording and reproducing data. All of these transducers are movable as a unit radially of their associated disks to cooperate with different ones of the data tracks. There is also provided a format transducer which moves with the data transducers for reading from the appropriate format track at any one of the different radial track positions.

Each format track comprises an arrangement of magnetic bits separated by gaps, and it is this combination of magnetic bits and gaps therebetween which is sensed by the format transducer to control the reading or writing operations on the associated cylinder of data tracks. The particular configuration of the different format tracks will depend upon the desired organization of the data records. In addition to controlling the length of the data records, the format tracks may be utilized to control other functions. Where each data record on the data surfaces is preceded by an address which identifies the subsequent record, the format track for each such record may include a portion for controlling this address portion. Similarly, the format track may include an automatic gain control portion where the data surfaces include a portion for AGC pulses to control the gain of the reading amplifier on a readback operation.

While the format track controls the length of records, the data which is read or written in the data tracks is under control of a timing source. The format track initiates and terminates the data at a particular point in the data track, and then initiates the control of writing or reading a series of check bits which provide error detection or correction. The end of format should coincide with the writing of the last character of data but it has been found that the transducer associated with the format track may vibrate to such an extent that the end of format may be sensed at a time which is not in coincidence with writing of the last data character. This would cause the series of check bits to be written or read in a position on the data tracks which would either be too late or too early such that some of the data would be eliminated from the transfer.

It is a general object of this invention to enable a format to accurately control the flow of data in a storage device in spite of possible misalignment of the format reading means.

It is also an object of this invention to provide a means whereby a control function which is normally generated at the end of a predetermined number of counting cycles of two counters can be postponed by more than one complete counting cycle of one counter after the other has completed the prescribed number of counting cycles.

These and other objects, features and advantages are realized in a preferred embodiment of the invention wherein a transducer associated with a format track develops pulses to be counted by a counter. The format counter cycles should correspond to cycles of a second counter which controls the reading and writing of data in data tracks in response to timing pulses. The format counter and data counter should complete counting cycles simultaneously but may get out of synch during the format. The invention provides logic for recognizing when the data counter and format counter get out of synch so that when the end of format is recognized, the logic will initiate a control function only when the data counter has completed a prescribed number of cycles representing all the data within the area defined by the format.

The foregoing and other objects, features and advantages of the invention will be apparent from the following more particular description of the preferred embodiments of the invention, as illustrated in the accompanying drawings.

In the drawings:

FIGURE 1 is a schematic drawing illustrating the invention wherein the out-of-synch or skew condition of a format and data is recognized;

FIGURE 2 is a timing diagram illustrating the relative positions of data and format in a data storage device;

FIGURE 3 is a schematic drawing illustrating one embodiment of the skew detector shown in FIGURE 1;

Figure 4:
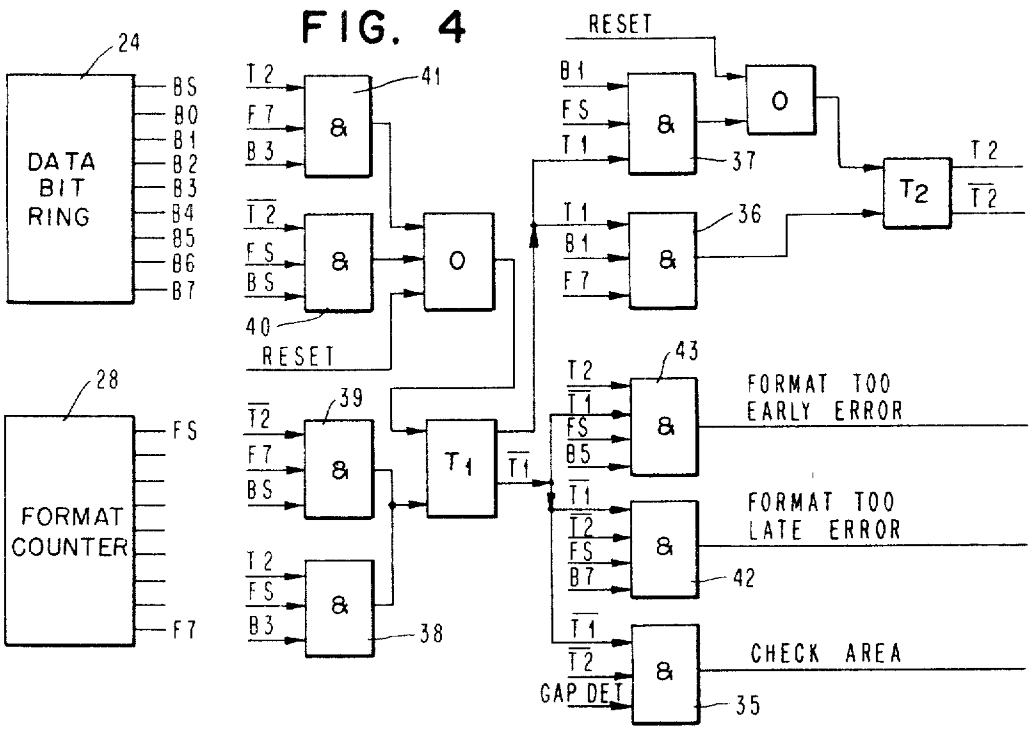
FIGURE 4 is a schematic drawing illustrating another embodiment of the skew detector shown in FIGURE 1.

Referring to FIGURE 1, an embodiment of the invention is illustrated in connection with a disk file 11 comprising a plurality of disks 12, 13, 14. . . . All of the disks are mounted for rotation on a common spindle 10 which is driven by suitable motive power means (not shown) for rotating all of the spaced disks at a suitable speed. Each of the disks is preferably provided with a magnetizable recording material on both of its surfaces, and each such recording surface is divided into a plurality of concentric recording tracks such as tracks 12*a*, 12*b*, 12*c*, 13*a*, 13*b*, 13*c*, 14*a*, 14*b*, 14*c*. Each disk surface is preferably provided with an individual transducer which magnetically cooperates therewith for recording on the surface and reproducing the recorded information. Such transducers may be in the form of read-write heads 12*h*, 13*h*, 14*h* for the different disk surfaces illustrated.

All of the read-write transducers are preferably mounted for common movement radially of their associated disk surfaces, as indicated by the dotted line representing a mechanical connection. Such movement may be provided by any suitable means, such as the positioning mechanism disclosed in the copending application, Ser. No. 55,994, of Marshall E. Freeman, assigned to the same assignee as the present application. The read-write transducers are thus positionable to any one of a plurality of discrete track positions for cooperating with the magnetic track immediately adjacent thereto. In this connection, although only three disks have been illustrated, it will be understood that a commercial disk file embodying the invention may involve a large number of such disks. Similarly, although only a few tracks per disk are illustrated, it will be understood that a large number, such as 250, of these concentric tracks may be provided on each disk surface, and that the associated transducers will be positionable to any one of these different tracks.

In the illustrated embodiment, it is assumed that disk surface 12 is the format disk surface for controlling the arrangement of records on the underlying data disk surfaces 13, 14, etc. The different tracks 12*a*, 12*b*, 12*c*, etc. on the format disk surface 12 will be thus laid out in accordance with the record format desired on the underlying tracks on the data disks, and this format arrangement on the format disk will control the start, length and stop of the records on the underlying data disks.

Before describing the manner in which the invention recognizes skew between format tracks and data, and how skew is corrected, consider the arrangement of a typical data track and a typical format track as shown in the graphs of FIGURE 2. FIGURE 2*a* illustrates one representative record on a data track; such a record includes a data portion which comprises any desired number of characters. It will be understood that each such character in the data portion will be made up of different combinations of binary bits in the particular binary code being utilized. The data portion of the record will be preceded by an address portion which is a combination of characters which identify the subsequent data in that record.

The above-mentioned copending application describes in greater detail the various controls which can be initiated by a format track. FIGURE 2 is only presented to show the control of the reading or writing of addresses and data. In connection with one of the data areas, it is the function of the format to initiate the recording or reading of a plurality of data characters each containing 9 bit positions. Assuming there will be no vibration of the transducer associated with the format track, it is the function of the end of format condition to recognize that the next data character is the last such that immediately following the recording or reading of that data character, a 9 bit check character for purposes of error detection should be written or read. It is the function of one embodiment of the present invention to be able to recognize that the end of format condition has occurred at a time when there still remains more than two data characters to be read or written prior to the initiation of the control which will read or write the check character.

Referring to FIGURE 1 again, there is shown schematically logic for causing the accurate control of data flow utilizing the format track. A particular data transducer which is to read or write data under control of the format transducer 12*h* is enabled by a head and read/write select 20. Data input/output register 21 accepts characters from an external system 22 for serial recording by data transducers, or receives serial data bits from data transducers for presentation to the system 22. During the reading or writing of data, a check character generator 23 develops a series of bits which represent an error detecting or correcting code. During writing, it will be the function of the present invention to detect when the check character being developed should be recorded such that it immediately follows the data recorded. During the reading of data from the data tracks, a check character is also generated which will then be compared with the previously recorded check character at the end of the data transfer. As mentioned previously, it is the function of the present invention to generate a control signal to insure that the check character is read or written at the proper time even though the format transducer 12*h* may be vibrating to such an extent that the detected end of format does not coincide with the completion of data reading or writing.

The transfer of the serial bits from register 21 to the data transducers is controlled by a data bit ring counter 24. The data ring 24 is shown to be generating a series of output pulses S, 0, 1, through 7, and will be referred to in the remaining description as count outputs from the bit ring labeled BS, B0, B1, through B7.

The stepping of the data ring 24 can be accomplished in several ways. In the above-mentioned copending application, it is suggested that the ring 24 could be stepped by an external oscillator such as shown at 25, by pulses developed from a format read amplifier such as 26, or by read timing means such as 27, which develops timing pulses from a timing transducer 12*n* which reads a permanently recorded timing track shown schematically at 12*d*.

In the above-mentioned copending application, there was shown and described a format counter 28 utilized to control the writing of a format. Once the format has been written, the same format counter 28 will be utilized in the present invention to provide an input to logic for determining skew or out-of-synch condition in the format counter 28 and the data bit ring 24.

Predetermined counts of the format counter 28, labeled FS and F7 and predetermined counts of the data bit ring 24, labeled BS, B1 and B3, are applied to a skew detector 29. Logic within the skew detector 29 responsive to the outputs of the two counters is capable of indicating when the format counter 28 has completed its counting cycle at a time when the data bit ring 24 must complete one, two, or more than two cycles before initiating a control function. As mentioned previously, the control function to be initiated by the skew detector 29 is the causing of the check character generator 23 to be read. A gap detector 30 is provided, which is responsive to the output pulses from the format transducer **12*h*, for indicating to the skew detector 29 logic that the format counter 28 has completed all of the counting cycles. The logic within the skew detector 29 is combined with the gap detector output for ultimately initiating the reading from the check character generator 23**.

Before proceeding with a discussion of the logic of the skew detector 29 of FIGURE 1, as shown in FIGURES 3 and 4, reference will be made to FIGURE 5 which shows timing diagrams for illustrating what is considered normal operation for the format counter 28 and data bit ring 24. Waveforms *a* and *b* of FIGURE 5 indicate a synchronous condition between the format counter 28 and the data bit ring 24. In this situation, count B7 and F7 should coincide. The format is arranged such that when the format counter 28 reaches count F7 at the end of the format area, the counter 28 will remain at a count of F7. Waveform *e* shows that the gap detector 30 of FIGURE 1 produces an output a short time after the last pulse is received from the format track. Normal operation is such that when the gap detector has produced an output, this is an indication that the data bit ring is in the process of controlling the transfer of the third from the last data character such that when the data bit ring 24 reaches a count of B7, it is then time for the Check Area to be indicated. This is the time indicated by waveform *f* and is used to condition the Check Character Generator 23 and prevent any further calls for characters from the system.

In one embodiment of the invention, to be described in more detail in connection with FIGURE 4, the logic provided is capable of recognizing when the end of format condition causes the format counter 28 to complete its counting cycles at a point in time represented by waveform *g* in FIGURE 5. In this situation, the logic provided in the skew detector 29 must be capable of recognizing that not only must the present cycle of the data bit ring 24 be completed, but that two complete counting cycles of the data bit ring 24 are required before initiating the Check Area signal such as shown in waveform *k*. The normal end of format is caused to occur three data characters earlier than the last data character to insure that a complete data character is not lost. If the format transducer vibrates to a point where the end of format is recognized late, the logic must only be required to recognize that when the end of format gap is detected, such as in waveform *m* of FIGURE 5, the Check Area should be immediately indicated. The logic to be discussed in connection with FIGURE 4 is capable of recognizing the late condition such as shown in waveforms *l*, *m* and *n* in FIGURE 5, but the discussion will be primarily concerned with the early condition.

Figure 5:
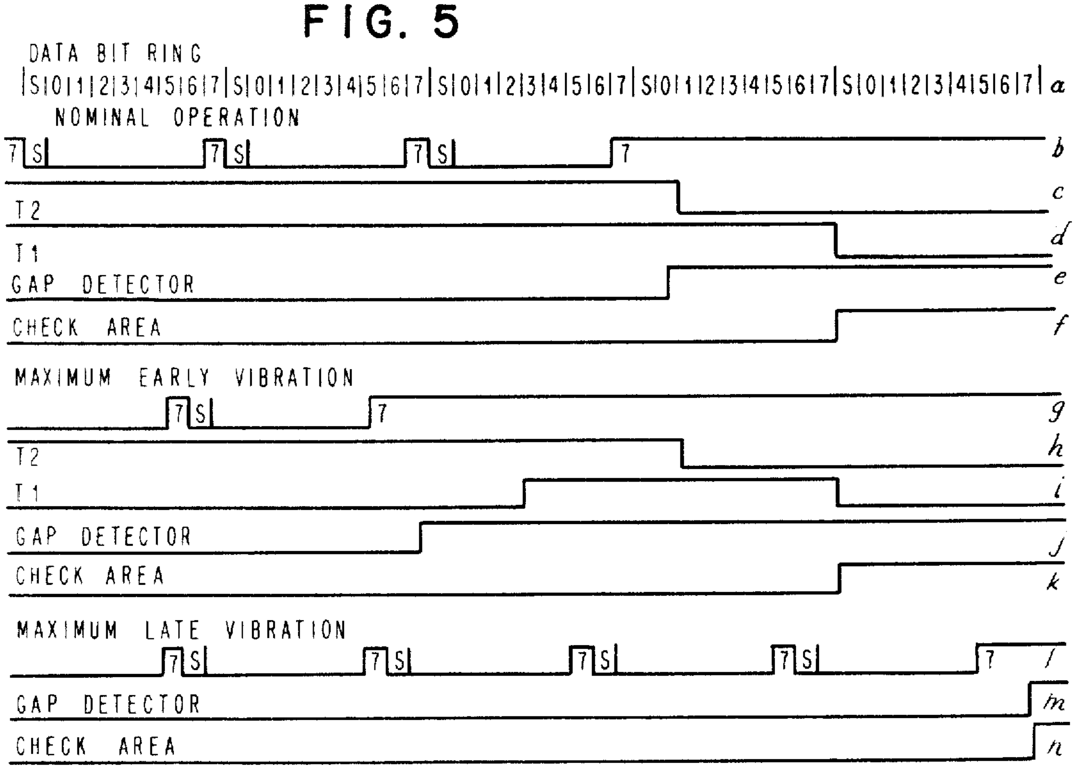
FIGURE 5 is a series of timing diagrams illustrating the relationships among various elements of the embodiment of FIGURE 4.

With reference to FIGURES 3 and 5, there is shown an embodiment of the invention which is capable of recognizing that the format counter has completed its counting cycles at some point within the third from the last cycle of the data bit ring 24. The embodiment of FIGURE 3 is only capable of affording proper operation if the vibration of the format transducer does not exceed one data bit ring cycle. The Check Area signal must occur during the next to last data character. The control function which is to be initiated by the present invention is the indication of the time when the Check Area is to be indicated. This is accomplished at an AND circuit 31 in response to the output of gap detector 30 of FIGURE 1 and an output from logic connected to the data bit ring 24 and the format counter 28. This logic includes a trigger T1, an AND circuit 32, and an AND circuit 33. When the beginning of a format is detected, trigger T1 is reset to the ON condition. If the format counter 28 and data bit ring 24 remain in synchronism such that output BS is generated at the time format counter is standing at count F7, AND circuit 33 will be energized to turn trigger T1 OFF. The OFF condition of trigger T1 is the required output to AND circuit 31 for initiating the check area. In this embodiment of the invention, the initiation of an output from AND circuit 31 is a signal which will be utilized by the system for indicating that the present cycle of the data bit ring 24 is the next to last data character such that when the data bit ring 24 completes this and the next cycle, it is then time to initiate the reading or writing of the check character.

If the transducer which is reading the format bits should vibrate to a point where timing pulse BS is generated at the same time the format counter 28 is indicating a count of FS, AND circuit 32 will turn ON trigger T1 indicating that the format is early by one counting cycle of the data bit ring 24. Trigger T1 therefore is turned ON and OFF at various times depending on whether or not the data bit ring 24 and format counter 28 are in synchronism or whether the format counter 28 has advanced into a counting cycle earlier than the data bit ring 24.

FIGURE 4 is an embodiment of the invention wherein the second trigger T2 is added to the logic of the skew detector so that a vibration of the format transducer exceeding one data character cycle can be recognized to still initiate the reading or writing of the check character at the proper time. The ultimate output of the FIGURE 4 embodiment is from an AND circuit 35 which will then initiate the reading or writing of the check character. Before the check character area is recognized, the end of format gap detector 30 of FIGURE 1 will produce an output at a time when both triggers T1 and T2 are in the OFF condition. It is the function of the logic shown in FIGURE 4 to be able to generate the waveforms *g* through *k* in FIGURE 5 in the presence of vibration of the format transducer which causes the end of format gap to occur more than one character cycle prior to normal. In the logic of FIGURE 4, triggers T1 and T2 should both be in the ON condition at the time the data bit ring 24 is in the process of controlling the reading or writing of the last data character. The ON and OFF condition of triggers T1 and T2 at the time of the Gap Detector output indicate the amount of vibration that has occurred to allow the proper operation of the skew detector logic to initiate the reading or writing of the check character at the proper time. Triggers T1 and T2 are reset to the ON condition when the beginning of the format is recognized. Trigger T2 can be turned OFF by the output of an AND circuit 36 and can be turned ON by the output of an AND circuit 37. Trigger T1 can be turned OFF by an AND circuit 38 or an AND circuit 39 and can be turned ON by an AND circuit 40 or AND circuit 41. The timing inputs to the AND logic shown in FIGURE 4 provide the necessary inputs to turn triggers T1 and T2 ON and OFF during the reading of a format portion for indicating at any patricular time the amount of skew or out of synchronism between the data bit ring 24 and the format counter 28. By starting with waveform *b* of FIGURE 5, and assuming that the format counter 28 counts start to drift to the left in the face of vibrations to the early condition, it can be seen that at some time during the format period, the count FS and B3 will coincide at AND circuit 38 to turn trigger T1 OFF. Triggers T1 and T2 are now in a condition which represents the maximum vibration which can be allowed with the two-trigger embodiment. If at any time during the format period the format transducer should start to vibrate toward the late condition, counts F7 and B3 will coincide at AND circuit 41 to again turn trigger T1 ON. If the format transducer should continue to vibrate toward the late direction, a point in time will be reached wherein count B1 and F7 will coincide at AND circuit 36 to turn trigger T2 OFF. If this should be the condition of the triggers T1 and T2 at the time the gap detector output occurs, the logic recognizes the fact that it is presently counting a cycle of the data bit ring 24 which coincides with the third from the last data character. With trigger T2 OFF, trigger T1 can be turned OFF, by the coincidental application of counts F7 and BS at AND circuit 39. It is at this time that AND circuit 35 will be enabled to initiate the Check Area signal.

AND circuits 42 and 43 are provided in the embodiment shown in FIGURE 4 for providing output signals to a system for indicating when the format transducer has vibrated to such an extent that the end of format has been recognized too early or too late for the skew detector 29 of FIGURE 1 to provide a proper control for the generation of, or reading of, the check character.

Without departing from the spirit of the invention, it should be evident to those skilled in the art that additional amounts of skew or out of synchronization between the format counter 28 and the data bit ring 24 could be recognized and compensated for by the addition of more triggers such as T1 and T2. Further, embodiments have been shown wherein the counts of the two counters have been shown to be equal to nine, but that depending on the format of the data characters, many other count quantities could be used. Further, the invention has been shown in connection with a data storage device of the random access disk type utilizing formats but that other forms of storage devices could be adapted to this type of operation. Two magnetic tapes could be mechanically linked together such that one magnetic tape would contain a format for data tracks on another magnetic tape. Also, although the invention has been shown in relation to magnetic recording, other forms of recording and reproducing devices should be apparent to those skilled in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for controlling the flow of data to and from a storage device having a plurality of tracks for recording at least one of said tracks having recorded thereon a format comprising a plurality of bits with gaps therebetween defining the boundary of data on at least one data track, said apparatus comprising:

a plurality of transducers for cooperating with said tracks;

a first counter, responsive to bits sensed by one of said transducers associated with said format track for developing outputs corresponding to predetermined counts in said counter;

timing means;

a second counter responsive to said timing means operative to provide outputs for controlling the sensing and recording of data on said data track by another of said transducers associated with said data track;

said first and second counters normally operative to initiate a control function at the completion of a plurality of counting cycles, each cycle of said second counter representing a data character having a plurality of bits corresponding to the outputs of said second counter;

logic means connected to the outputs of said first and second counters; and means connected to said logic means, responsive to the sensing of the end of format bits by said associated format transducer, for initiating said control function only if said second counter has completed a counting cycle corresponding to a predetermined character of data within the boundary defined by said format bits.

2. Apparatus in accordance with claim 1 wherein said logic means includes:

means, operative at the beginning of sensing format bits, for producing a first predetermined output corresponding to a desired output when said second counter is beginning the counting cycle corresponding to the predetermined character of data within the boundary defined by said format bits; and means, responsive to the outputs of said first and second counters, to change said logic means to a second predetermined output upon completion of said predetermined cycle of said second counter to initiate said control function.

3. Apparatus in accordance with claim 2 wherein said logic means further includes:

means, connected to the outputs of said first and second counters, operative during the sensing of said format bits, for producing a third predetermined output indicating the completion of a counting cycle of said first counter more than one cycle prior to the completion of the corresponding cycle of said second counter.

4. Apparatus for controlling the flow of data to and from a storage device having a plurality of tracks for recording, at least one of said tracks having recorded thereon a format comprising a plurality of bits with gaps therebetween defining the boundary of data on at least one data track, said apparatus comprising:

a plurality of transducers for cooperating with said tracks;

a first counter, responsive to bits sensed by one of said transducers associated with said format track for developing outputs corresponding to predetermined counts in said counter;

timing means;

a second counter responsive to said timing means operative to provide outputs for controlling the sensing and recording of data on said data track by another of said transducers associated with said data track;

said first and second counters normally operative to initiate a control function at the completion of a plurality of counting cycles, each cycle of said second counter representing a data character having a plurality of bits corresponding to the outputs of said second counter;

first and second bistable devices connected to the outputs of said first and second counters, the combination of stable states of said devices providing outputs indicating predetermined relationships between the outputs of said first and second counters; and means connected to said first and second bistable devices, responsive to the sensing of the end of format bits by said associated format transducer, for initiating said control function only if said second counter has completed a counting cycle corresponding to a predetermined character of data within the boundary defined by said format bits.

5. Apparatus in accordance with claim 4 including:

means responsive to the beginning of sensing of format bits for setting said devices in a first combination of states indicating that said first counter is starting its counting cycles no more than one-half cycle earlier than corresponding cycles of said second counter;

means, responsive to predetermined counts of said first and second counters for changing the states of said devices to a second combination indicating said first counter has started a counting cycle more than one-half cycle earlier than a corresponding cycle of said second counter;

means connected to predetermined outputs of said counters, operative at the end of sensing said format bits, for producing said first combination of states prior to the beginning of the cycle of said second counter corresponding to said predetermined character of the data record;

means connected to predetermined outputs of said counters, when said devices are in said first combination of states, for producing a third combination of states indicating said second counter is counting in the cycle corresponding to said predetermined data character;

means connected to said first and second counters, operative when said devices are in said third combination of states for producing a fourth combination of states indicating said second counter has completed the counting cycle corresponding to said predetermined data character; and means, operative in response to the said fourth combination of states and detection of the end of sensing of said format bits for initiating said control function.

References Cited

UNITED STATES PATENTS 3,195,118 7/1965 St. Clair ---------- 340—174.1

ROBERT C. BAILEY, *Primary Examiner.*

R. ZACHE, *Assistant Examiner.*